UNITED STATES PATENT OFFICE.

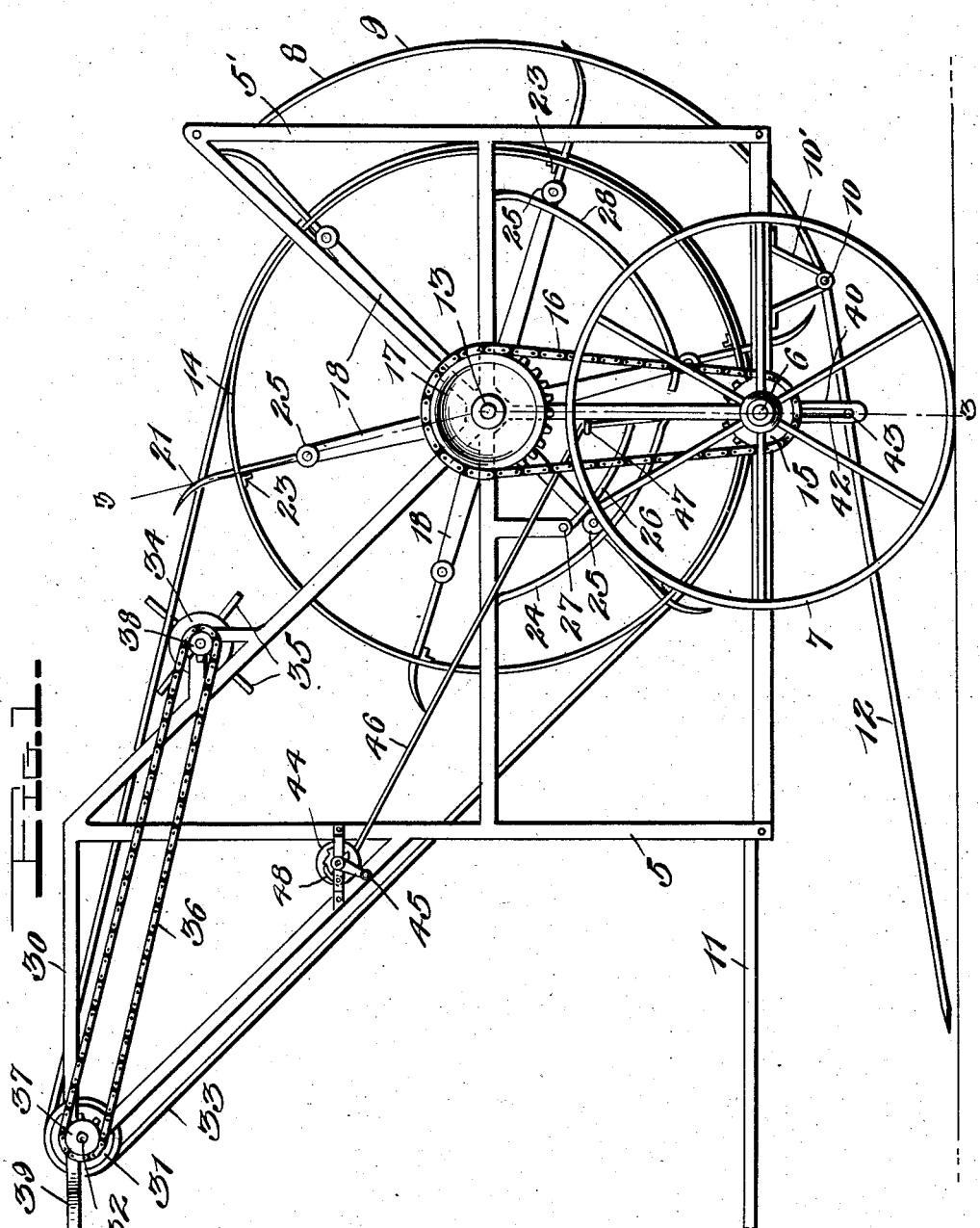

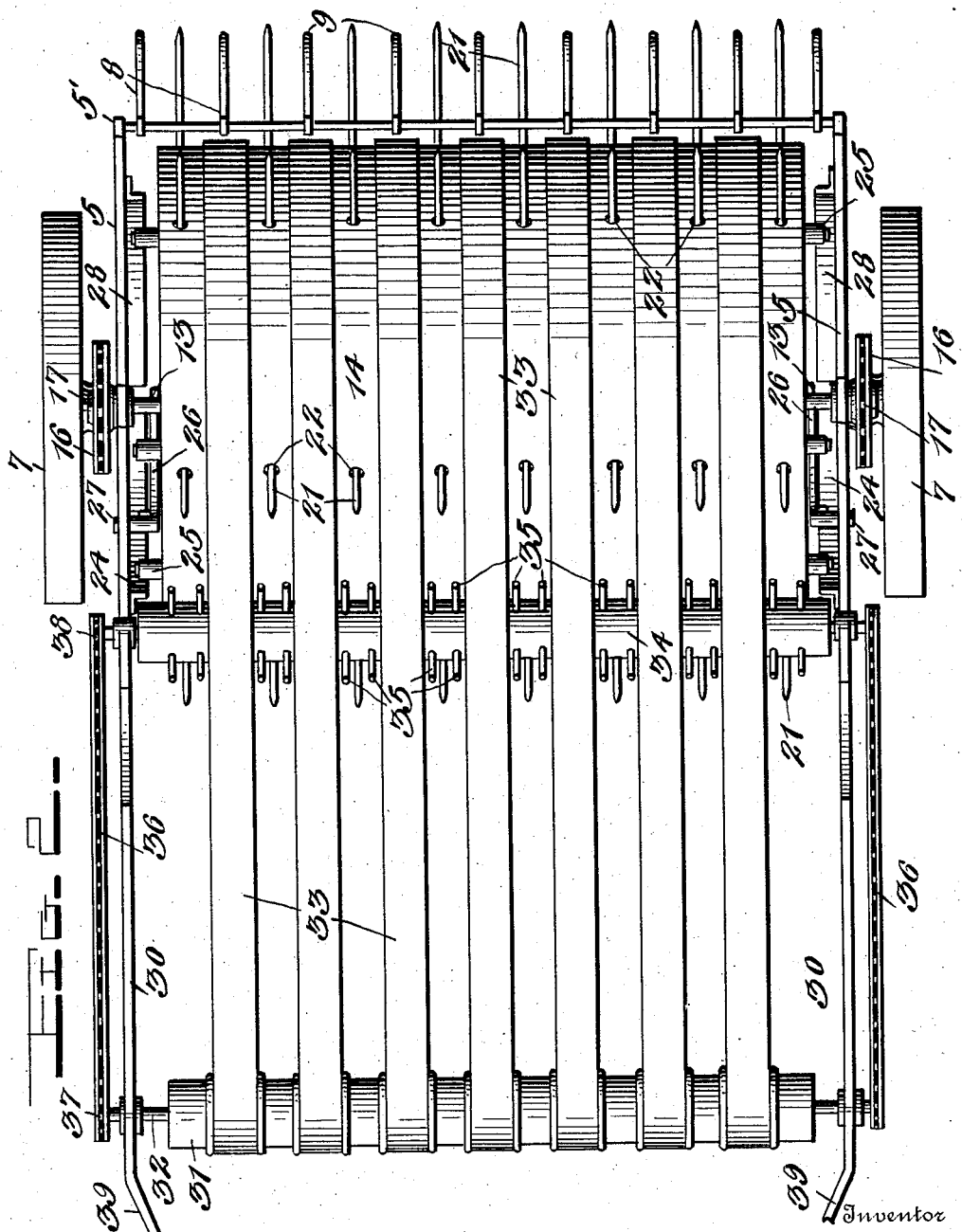

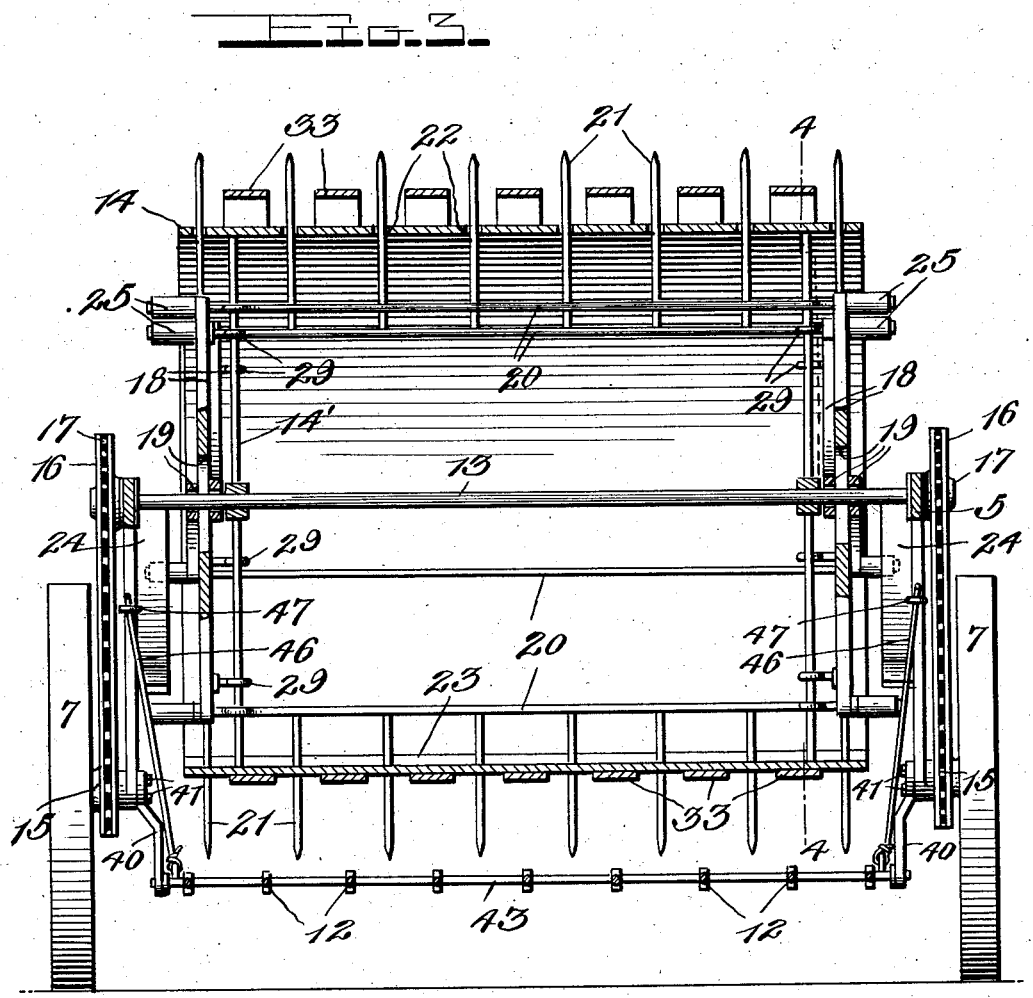

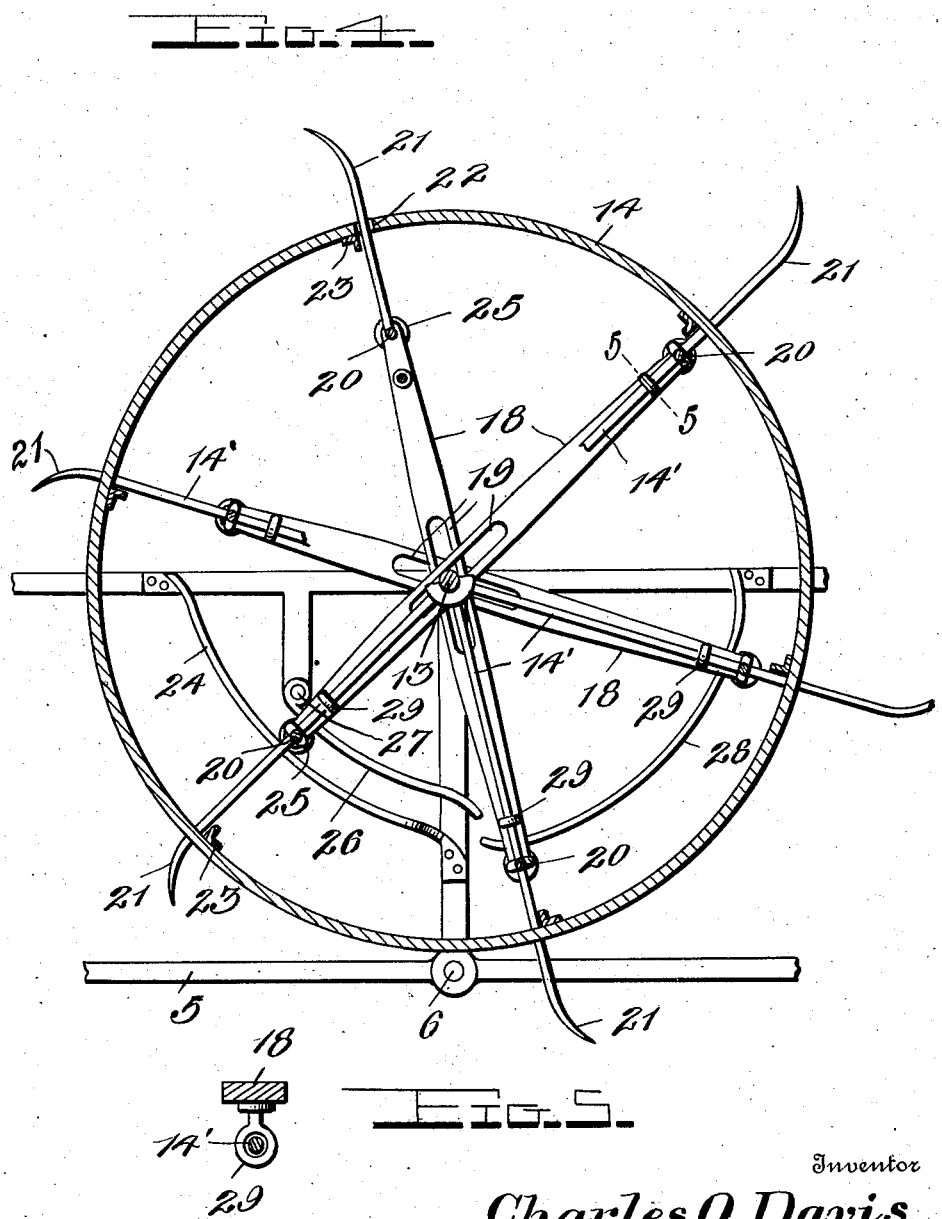

CHARLES O. DAVIS, OF RUPERT, IDAHO.

HAY-LOADER.

1,027,465. Specification of Letters Patent. Patented May 28, 1912.

Application filed June 5, 1911. Serial No. 631,200.

*To all whom it may concern:*

Be it known that I, CHARLES O. DAVIS, a citizen of the United States, residing at Rupert, in the county of Lincoln and State of Idaho, have invented certain new and useful Improvements in Hay-Loaders, of which the following is a specification, reference being had to the accompanying drawings.

This invention relates to hay loaders and more particularly to a loader of that character which is adapted to be attached to the rear of the hay rack upon which the hay is to be loaded, the invention having for its primary object the provision of means whereby the hay may be quickly and satisfactorily loaded from swath, windrow, or bunch in the movement of the machine over a field.

Another object of the invention is to provide a revoluble cylinder having movable teeth therein projecting beyond its periphery, a ground rake from which the hay is gathered by said teeth, and a plurality of conveyer belts driven by said cylinder, upon which the hay is thrown and from which it is discharged into the transporting vehicle.

A further object of my invention is to provide improved means for mounting the movable teeth in the cylinder whereby they are automatically positioned as they approach the ground so as to prevent packing of the hay and insure the same being lifted by said teeth and thrown upon the conveyer belts.

Still another object of the invention is to provide means for freeing the cylinder teeth of the hay as they move below the conveyers and to prevent the same from carrying the hay beyond the proper point.

Still further objects of the invention are to provide means for directing the hay upon the rack or transporting vehicle as it is discharged from the conveyer, and means for elevating the ground rake teeth to an inoperative position.

With the above and other objects in view, the invention consists of the novel features of construction, combination and arrangement of parts hereinafter fully described and claimed, and illustrated in the accompanying drawings, in which—

Figure 1 is a side elevation of a hay loader embodying my improvements; Fig. 2 is a top plan view thereof; Fig. 3 is a transverse section taken on the line 3—3 of Fig. 1; Fig. 4 is an enlarged section of the cylinder showing the manner in which the teeth carrying bars are automatically forced downwardly driving the teeth into the hay upon the ground rake; and Fig. 5 is a detail section taken on the line 5—5 of Fig. 4.

Referring in detail to the drawings 5 designates a frame structure which is arranged upon the transverse axle studs 6 upon which the supporting wheels 7 are revolubly mounted. This frame consists of the horizontal base section, and front and rear upright sections, said rear section 5' of less height than the front section. To the upper transverse bar of this rear frame section, the ends of the rake bars or tines' 8 are secured. These rake bars extend downwardly and are rearwardly bowed or curved as indicated at 9 and extended between the longitudinal side bars of the base of said frame and are secured to a transverse bar 10 which is pivoted at its ends in the V-shaped hangers 10' fixed to the side of the frame. To the front end of the frame the tongue 11 is suitably connected and is adapted to be attached to the rear axle of the hay rack. To the transverse bar 10, the rear ends of the movable horizontally disposed rake teeth 12 are pivoted, said teeth extending forwardly of the frame and below the tongue 11. These ground rake teeth are adapted to be raised and lowered to their inoperative or operative positions in the manner to be hereinafter set forth.

Suitable bearings are centrally arranged in the sides of the frame in which the transversely disposed cylinder shaft 13 is rotatably mounted. Upon this shaft the cylinder 14 is arranged, and is braced at intervals by the radial bars or struts 14'. To the ground wheels 7, the sprockets 15 are secured in any desired manner and are connected by means of the power transmission chains 16 with the sprockets 17 fixed upon the ends of the cylinder shaft 13 whereby said cylinder is revolved in the movement of the machine over the ground.

Upon each end of the cylinder shaft 13 and just within the ends of the cylinder 14, a plurality of radially movable bars 18 are arranged, said bars each being provided with a central longitudinal slot 19 through which the cylinder shaft extends. The outer end of the corresponding bars on the ends of the cylinder shaft are connected by means of the transverse bars 20 and to these bars 20 a plurality of teeth 21 are rigidly secured and are movable through openings 22 provided in the annular wall of the cylinder. To the inner surface of the cylinder wall, a lug or brace plate 23 is secured adjacent to the openings 22 to guide and brace the teeth 21 in their movement through said openings.

The bars 18 at each end of the cylinder shaft are arranged closely adjacent to each other and are independently movable. The means whereby these bars are automatically moved upon the cylinder shaft to project the rows of teeth 21 at the proper point in the rotation of the cylinder, is substantially as follows: At each of its ends to the frame 5, a curved plate 24 is secured, said plate extending in eccentric relation to the cylinder 14 and being located at a point substantially midway between its center and periphery. With this curved plate the rollers 25 mounted upon the ends of the radially movable bars 18 are adapted to engage. A heavy leaf spring 26 is fixed at one end and at a point above the center of the eccentrically disposed plate 24, as indicated at 27 to the frame 5. This spring is normally disposed in a vertical plane and is engaged by the rollers 25, carried on the bars 18, and forced upwardly into spaced parallel relation to the plate 24 as shown in Fig. 1. When so disposed the free end of the spring plate 26 extends slightly beyond the lower end of the plate 24. Thus it will be seen that when the rollers 25 move off of the plate 24, the bars 18 are forced downwardly by the spring plate 26, thereby projecting the lowermost row of teeth 21 through the cylinder wall and into the hay which is gathered upon the rake tines. A second plate 28 is also secured to the frame 5 adjacent to the periphery of the cylinder 14 and in eccentric relation thereto, and the rollers 25 on the ends of the side bars 18 are adapted to engage with the outer face of this plate whereby the teeth 21 are held in their extended positions as they move upwardly in the rotation of the cylinder. An eye 29 is swiveled to each of the radial bars 18 adjacent each of its ends and surrounds the brace bars 14' upon which said eyes are freely movable, said brace bars acting as guides for the bars 18 and preventing any rotative movement of the same on the cylinder shaft, thereby relieving the teeth 21 of considerable strain.

To the front of the frame 5 and at the upper end thereof, the forwardly extending supporting members 30 are secured. Between these supporting members, a transversely disposed roller 31 is arranged, the ends of the roller shaft 32 being mounted in suitable bearings secured to the members 30. A plurality of conveyer belts 33 extend around the cylinder 14, passing between the adjacent teeth 21 thereof, and traverse the roller 31. This roller may be made of any desired material whereby sufficient friction upon the conveyer belts is secured. The conveyer belts 33 may be formed of leather, canvas, wire or any other desired material, and the upper forward ends thereof which pass around the roller 31 are disposed above the hay rack or other transporting vehicle in the operation of the machine. A second roller 34 is also mounted in rear of the supporting members 30, rearwardly of the roller 31 and beneath the upper stretches of the conveyer belts 33. This roller sustains the conveyer belts and carries a plurality of cleaning teeth 35 which are preferably arranged in pairs and are adapted to pass between the ends of adjacent cylinder teeth 21 and relieve the same of the hay as they pass downwardly below the plane of the upper stretches of the conveyer belts. This cleaning roller is driven through the medium of a chain 36 which passes around a sprocket 37 fixed upon the shaft 32 of the roller 31 and around a similar sprocket 38 fixed to the ends of the shaft of the roller 34. Thus it will be seen that the teeth 35 on the roller 34 move in the opposite direction to the teeth 31 carried by the cylinder 14. To the forward ends of the supporting members 30, the forwardly and inwardly extending guide fingers 39 are secured, said fingers being adapted to direct the hay inwardly upon the rack.

To the sides of the main frame 5, the bars 40 are secured, the upper ends of said bars being slotted to receive bolts 41 fixed in the frame, suitable clamping nuts being threaded upon said bolts whereby the bars 40 may be rigidly clamped to the frame in their adjusted positions. The lower ends of the bars 40 are offset and inwardly disposed in spaced relation to the sides of the frame and are provided with the longitudinal slots 42 in which the ends of the transverse rod 43 are movably disposed. This rod is secured to and connects the tines of the forwardly extending movable rake 12. Upon the supporting members 30 a transversely disposed winding drum 44 is mounted and is adapted to be manually actuated by means of a crank handle 45, secured to one end thereof, and to the opposite ends of this winding drum the upper ends of the flexible connecting elements 46 are secured, the lower ends of said connections being secured to the ends of the rod 43. Guide eyes 47 are secured to the sides of the frame 5 through which said connections extend. It will be readily seen that by such construction, the movable rake 12 may be readily raised by simply rotating the drum 44 to wind the connections 46 thereon. An ordinary ratchet and pawl 48 is employed to prevent reverse rotation of the winding drum 44 when the rake is elevated.

From the foregoing it is believed that the construction and operation of my improved hay loader will be readily understood. Owing to the movable mounting of the series of cylinder teeth, said teeth are projected at the proper point in the rotation of said cylinder directly into the hay contained on the rake so that the hay will not be packed between the rake teeth, or the rake and the periphery of the cylinder. The ends of the cylinder teeth are slightly curved or bent so as to retain the hay thereon. By means of my improved construction, the hay rack or vehicle may be easily and quickly loaded. The device is also comparatively simple in construction and extremely efficient and durable in practical use.

While I have shown and described the preferred construction and arrangement of the various parts, it will be understood that the device is susceptible of considerable modification such as hay guards, guides, etc., without departing from the essential feature or sacrificing any of the advantages thereof.

Having thus described the invention what is claimed is:—

1. A loader of the character described comprising a revoluble cylinder including a cylinder shaft, a plurality of radially disposed bars movably mounted within each end of the cylinder upon said shaft, the ends of corresponding bars in opposite ends of the cylinder being connected by connecting bars, a plurality of teeth arranged in each of said connecting bars and movable through the annular wall of the cylinder, rollers mounted on the ends of said bars, means engaged by said rollers to successively move said bars and retract one of the series of teeth carried thereby and project the opposite series beyond the cylinder wall, said means retaining the teeth in such positions during a certain portion of the revolution of the cylinder, and means engaged by the rollers on one end of the bars and acted upon in the rotation of the cylinder to reverse the positions of the teeth series carried by said bars at the expiration of the aforementioned time period.

2. A loader of the character described comprising a revoluble cylinder including a cylinder shaft, a plurality of radially disposed bars movably mounted within each end of the cylinder upon said shaft, the ends of corresponding bars in opposite ends of the cylinder being connected by connecting bars, a plurality of teeth arranged in each of said connecting bars and movable through the annular wall of the cylinder, rollers mounted on the ends of said bars, means engaged by said rollers to successively move said bars and retract one of the series of teeth carried thereby and project the opposite series beyond the cylinder wall, said means retaining the teeth in such positions for a limited period of time, means engaged by the rollers on one end of the bars and acted upon in the rotation of the cylinder to reverse the positions of the teeth series carried by said bars at the expiration of the aforementioned time period, and additional means for retaining the opposed series of teeth in such latter positions for a further period in the rotation of the cylinder.

3. A loader of the character described comprising a revoluble cylinder including a shaft, a plurality of radially disposed movable bars arranged in each end of the cylinder, said bars having central longitudinal slots to receive the cylinder shaft, bars longitudinally disposed through the cylinder and connecting the extremities of corresponding radial bars in the ends thereof, a series of teeth fixed in each of the connecting bars and movable through the annular wall of the cylinder, rollers mounted on the ends of said radial bars, a stationary plate eccentrically disposed with relation to the cylinder to be engaged by said rollers, whereby the corresponding bars at opposite ends of the cylinder are radially moved upon the cylinder shaft to retract and project the opposite series of teeth through the cylinder wall and to maintain the teeth in such positions for a limited period of time in the rotation of the cylinder, a resilient element engaged by the rollers on said radial bars and acted upon thereby to reverse the positions of the opposed series of teeth with relation to the cylinder at the expiration of such time period, and a second eccentrically disposed plate to be engaged by the rollers of said bars whereby the series of teeth are retained in their latter positions for a further limited period in the rotation of the cylinder.

4. In a hay loader, a revoluble cylinder including a shaft, a plurality of radially movable bars arranged in each end of the cylinder, guides for said bars, bars connecting the ends of corresponding bars in opposite ends of the cylinder, a series of teeth fixed in each of the connecting bars and movable through the annular wall of the cylinder, a plate eccentrically disposed with relation to the cylinder, said bars co-acting with said plate in the rotation of the cylinder to radially move the bars and retract and project respectively the opposite series of teeth, said plate maintaining the teeth in such positions for a limited period of time in the rotation of the cylinder, a spring also co-acting with said bars and acting upon the same to reverse the radial movement of the bars at the expiration of such time period, and reverse the disposition of the series of teeth carried by said bars with relation to the cylinder, and a second eccentrically disposed plate co-acting with said bars to retain the series of teeth in the latter positions for a further period of time in the rotation of the cylinder.

In testimony whereof I hereunto affix my signature in the presence of two witnesses.

CHARLES O. DAVIS.

Witnesses:
 A. D. ASH,
 WM. CULLISON.